(12) United States Patent
Rubendall

(10) Patent No.: US 6,917,937 B1
(45) Date of Patent: Jul. 12, 2005

(54) SERVER-SIDE OBJECT FILTERING

(75) Inventor: Craig Rubendall, Morrisville, NC (US)

(73) Assignee: SAS Institute Inc., Cary, NC (US)

(*) Notice: Subject to any disclaimer, the term of this patent is extended or adjusted under 35 U.S.C. 154(b) by 874 days.

(21) Appl. No.: 09/704,281

(22) Filed: Nov. 1, 2000

(51) Int. Cl.$^7$ .......................... G06F 17/00; G06F 7/00; G06F 17/30

(52) U.S. Cl. .................... 707/5; 707/3; 707/4; 707/103

(58) Field of Search ........................... 707/3, 4, 5, 103

(56) References Cited

U.S. PATENT DOCUMENTS

| | | | |
|---|---|---|---|
| 5,999,940 A | * 12/1999 | Ranger .................... | 707/103 R |
| 6,078,924 A | *  6/2000 | Ainsbury et al. ........... | 707/101 |
| 6,085,196 A | *  7/2000 | Motoyama et al. ......... | 707/102 |
| 6,339,776 B2 | *  1/2002 | Dayani-Fard et al. ....... | 707/102 |
| 6,484,177 B1 | * 11/2002 | Van Huben et al. .......... | 707/10 |
| 6,819,339 B1 | * 11/2004 | Dowling .................... | 715/738 |

OTHER PUBLICATIONS

Bulletin of Technical Committee on Data Engineering, 09, 1999, vol. 22, No. 3.*

Arief et al. "A UML tool for an automatic generation of simulation programs", ACM 09, 2000.*

* cited by examiner

Primary Examiner—Frantz Coby
Assistant Examiner—Cindy Nguyen
(74) Attorney, Agent, or Firm—Jones Day

(57) ABSTRACT

A computer-implemented method and apparatus for retrieving over a network a subset of object data from a persistence layer. The persistence layer is structured at least partially upon an object model definition. A server computer receives over the network a request from a client computer for object persisted data stored in the persistence layer. The server computer parses the request to obtain search criteria and object association data, wherein the object association data identifies at least one association between a pair of objects. Filtering criteria is created based upon the parsed search criteria and object association data. The object model definition determines how the search criteria and the object association data form the filtering criteria. The object data from the persistence layer is filtered by the filtering criteria in order to generate the object data subset. The object data subset may also be encoded as a package of objects formatted as an Extensible Markup Language (XML) document. The server computer transmits the encoded object data subset to the client computer over the network.

56 Claims, 10 Drawing Sheets

FIG. 3

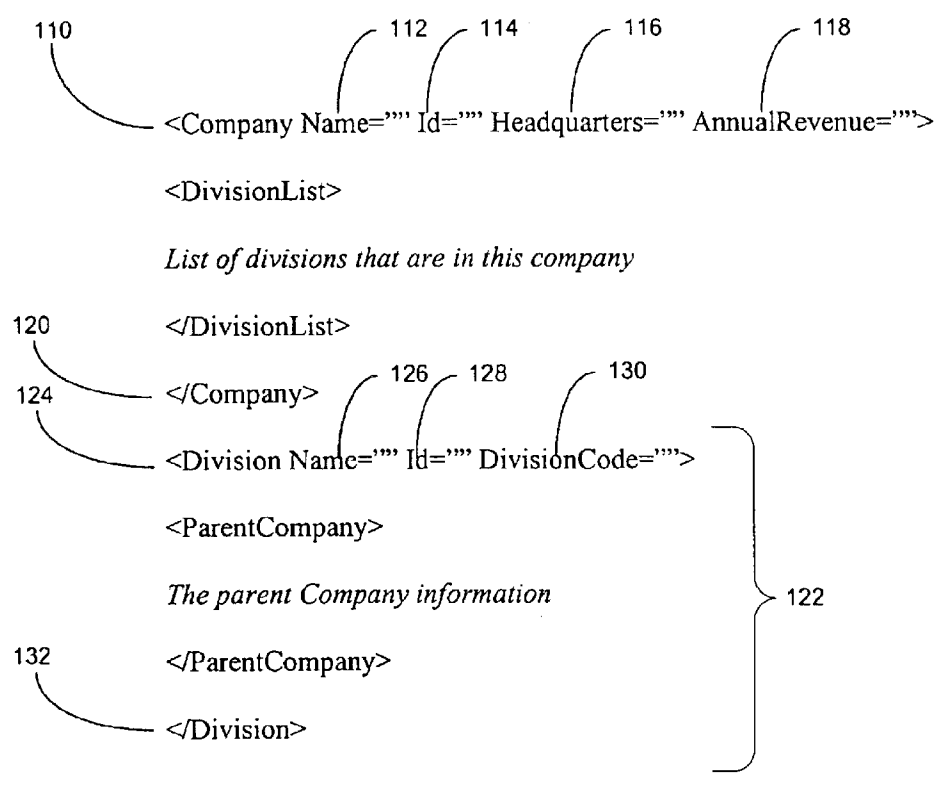

```
              ┌─112 ┌─114            ┌─116        ┌─118
     <Company Name="" Id="" Headquarters="" AnnualRevenue="">
       <DivisionList>
       List of divisions that are in this company
       </DivisionList>                      ┌─130
     </Company>                ┌─126 ┌─128
     <Division Name="" Id="" DivisionCode="">         ⎫
       <ParentCompany>                                 ⎬ 122
       The parent Company information                  ⎪
       </ParentCompany>                                ⎭
     </Division>
 110─┘
 120─────┘
 124──┘
 132────┘
```

FIG. 4A

```
110    ┌─114      ┌─112           ┌─118
   <Company Id="Company1" Name="Acme" AnnualRevenue="1,000,000"
      Headquarters="Raleigh,NC">
116      <DivisionList>
            <Division Id="Div1" Name="Development">
               <DepartmentList>
                  <Department Id="Dept1" Name="Widgets">
180                  <EmployeeList>
                        <Employee Id="Emp1" FirstName="Craig" LastName="Smith" HomeCity="Cary"
                     Salary="10,000">
190                        <Boss>
                              <Employee Idref="#Emp3"/>
                           </Boss>
192                     </Employee>
                        <Employee Id="Emp2" FirstName="John" LastName="Doe" HomeCity="Durham"
                     Salary="5,000">
                           <Boss>
                              <Employee Idref="#Emp3"/>
                           </Boss>
194                     </Employee>
                        <Employee Id="Emp3" FirstName="Fred" LastName="Jones" HomeCity="Apex"
                     Salary="20,000">
                        </Employee>
                     </EmployeeList>
                     <DepartmentHead>
                        <Employee Idref="#Emp1"/>
                     </DepartmentHead>
                  </Department>
196               <Department Id="Dept2" Name="Widgets">
                     <EmployeeList>
                        <Employee Id="Emp4" FirstName="Craig" LastName="Doe" HomeCity="Cary"
                     Salary="3,000">
                           <Boss>
                              <Employee Idref="#Emp6"/>
198                        </Boss>
                        </Employee>
                        <Employee Id="Emp5" FirstName="John" LastName="Smith"
                     HomeCity="Durham" Salary="15,000">
                           <Boss>
                              <Employee Idref="#Emp6"/>
                           </Boss>
                        </Employee>
```

```
200
  \
   \____  <Employee Id="Emp6" FirstName="Fred" LastName="Adams"
         HomeCity="Apex" Salary="26,000">
            </Employee>

</EmployeeList>

<DepartmentHead>
         <Employee Idref="#Emp6"/>
      </DepartmentHead>
      </Department>
182  </DepartmentList>
  \  </Division>
   \_</DivisionList>
      <SupplierList>
      <Company Idref="#Company2"/>
      </SupplierList>
      <ConsumerList>
120   <Company Idref="#Company3"/>
  \   </ConsumerList>
   \_ </Company>
      <Company Id="Company2" Name="BigCompany" AnnualRevenue="1,000,000,000"
      Headquarters="Philadelphia, PA">
         <DivisionList>
            <Division Id="BCDev" Name="Development">
               <DepartmentList>
                  <Department Id="BCDept1" Name="Objects">
                     <EmployeeList>
                        <Employee Id="BCEmp1" FirstName="Craig" LastName="Jones"
         HomeCity="Paoli" Salary="15,000">
                           <Boss>
                              <Employee Idref="#BCEmp3"/>
                           </Boss>
                        </Employee>
                        <Employee Id="BCEmp2" FirstName="John" LastName="Smith"
      HomeCity="Cherry Hill" Salary="20,000">
                           <Boss>
                              <Employee Idref="#BCEmp3"/>
                           </Boss>
                        </Employee>
```

```
        <Employee Id="BCEmp3" FirstName="Fred" LastName="Doe"
HomeCity="Reading" Salary="25,000">
        </Employee>
     </EmployeeList>
     <DepartmentHead>
        <Employee Idref="#BCEmp3"/>
     </DepartmentHead>
   </Department>
   <Department Id="BCDept2" Name="Relational">
     <EmployeeList>
        <Employee Id="BCEmp4" FirstName="Jill" LastName="Smith"
HomeCity="Pottstown" Salary="30,000">
            <Boss>
               <Employee Idref="#Emp6"/>
            </Boss>
        </Employee>
        <Employee Id="BCEmp5" FirstName="Donna" LastName="Wild"
HomeCity="Newark" Salary="15,000">
            <Boss>
               <Employee Idref="#BCEmp6"/>
            </Boss>
        </Employee>
        <Employee Id="BCEmp6" FirstName="Jane" LastName="Francis"
HomeCity="Dover" Salary="36,000">
            </Employee>

</EmployeeList>

<DepartmentHead>
        <Employee Idref="#BCEmp6"/>
</DepartmentHead>
</Department>
</DepartmentList>
</Division>
</DivisionList>
<ConsumerList>
<Company Idref="#Company1"/>
</ConsumerList>
<SupplierList>
<Company Idref="#Company3"/>
</SupplierList>
</Company>
```

```
<Company Id="Company3" Name="SmallCompany" AnnualRevenue="100,000"
Headquarters="Cleveland, OH">
   <DivisionList>
      <Division Id="SCDiv1" Name="Development">
         <DepartmentList>
            <Department Id="SCDept1" Name="RD">
               <EmployeeList>
                  <Employee Id="SCEmp1" FirstName="Bob" LastName="Jones"
         HomeCity="Canton" Salary="15,000">
                     <Boss>
                        <Employee Idref="#SCEmp2"/>
                     </Boss>
                  </Employee>
                  <Employee Id="SCEmp2" FirstName="John" LastName="Williams"
         HomeCity="Akron" Salary="20,000">
                  </Employee>
               </EmployeeList>
                <DepartmentHead>
                   <Employee Idref="#SCEmp2"/>
                </DepartmentHead>
               </Department>
         </DepartmentList>
      </Division>
   </DivisionList>
   <SupplierList>
   <Company Idref="#Company1"/>
   </SupplierList>
   <ConsumerList>
   <Company Idref="#Company2"/>
   </ConsumerList>
</Company>
```

SERVER-SIDE OBJECT FILTERING

BACKGROUND OF THE INVENTION

1. Technical Field

The present invention is generally directed to the computer database technical field, and more specifically to the field of distributed client/server database applications.

2. Description of the Related Art

Object Oriented programming has become the standard paradigm by which software is developed. As part of this paradigm, an object's state is often persisted. As software systems grow, the number of objects being persisted grows accordingly. In a complex software system, the object model contains many associations between the objects. These associations are also persisted. For example, an object model may contain over 90 classes and 180 associations that are stored in a persistence layer (which is usually a database).

In a distributed client/server application, the client needs to query the object model, which is located on the server, to obtain the persisted states of the objects. Under such current approaches as the Distributed Component Object Model (DCOM) and Common Object Request Broker Architecture (CORBA) model, the client application requests and receives a single object or a collection of like objects. To navigate a specific path through the object model, the client application must retrieve each set of objects along the path to get to the next set of objects in the path.

For example in a company information database application, the client application may want to find all company divisions that have employees who make more than $17,000. These approaches obtain that information by retrieving each of the division objects (10 objects transferred to the client application), loop through each one and get its departments (100 objects transferred to the client application), and loop through each one getting its list of employees (1000 objects transferred to the client application). From these 1000 objects transferred, only one division may actually have been needed by the client application. This is an inefficient process that requires the transmission of significant amounts of potentially irrelevant information across the network.

SUMMARY OF THE INVENTION

The present invention solves the aforementioned disadvantage as well as other disadvantages. In accordance with the teachings of the present invention, a computer-implemented method and apparatus is provided for retrieving over a network a subset of object data from a persistence layer. The persistence layer is structured at least partially upon an object model definition. A server computer receives over the network a request from a client computer for object persisted data stored in the persistence layer.

The server computer parses the request to obtain search criteria and object association data, wherein the object association data identifies at least one association between a pair of objects. Filtering criteria are created based upon the parsed search criteria and object association data. The object model definition determines how the search criteria and the object association data form the filtering criteria. Object data from the persistence layer is filtered by the filtering criteria in order to generate an object data subset. The server computer transmits the object data subset to the client computer over the network.

In one embodiment of the present invention, the present invention provides to the client application the object data subset as a package of objects formatted as an Extensible Markup Language (XML) document. This allows the object package to be searched at the server-side using XML standard searching mechanisms. In this manner, the present invention provides a way to search a large collection of data objects and return only the salient results across a distributed network environment in real time.

BRIEF DESCRIPTION OF THE DRAWINGS

The present invention satisfies the general needs noted above and provides many advantages, as will become apparent from the following description when read in conjunction with the accompanying drawings, wherein:

FIG. 3 is exemplary XML code showing the mapping of certain classes and associations into XML in accordance with the teachings of the present invention;

FIGS. 4A–4D show an example excerpt of the XML format that represents the object model in accordance with the teachings of the present invention;

DETAILED DESCRIPTION

Figure 1:
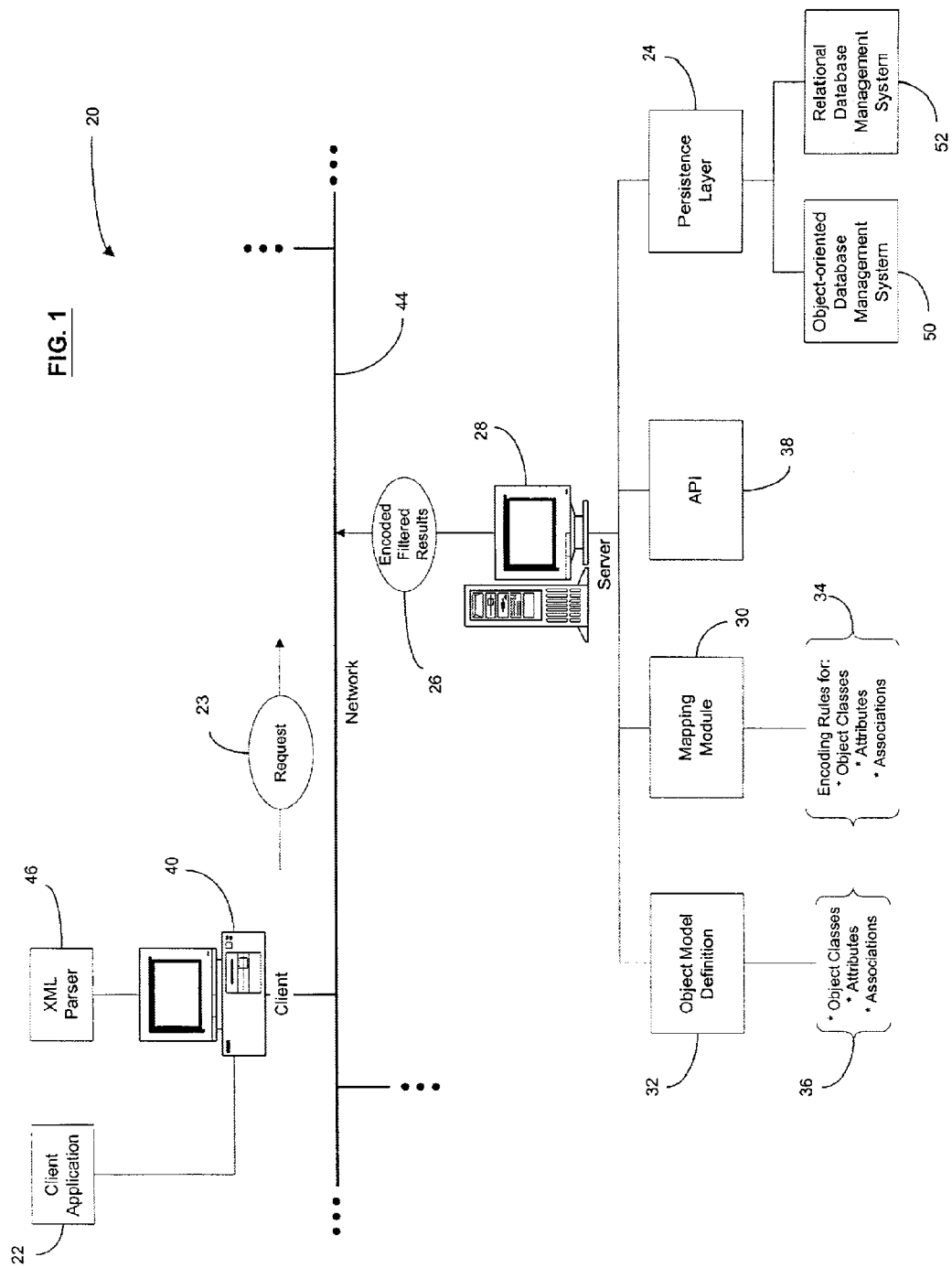
FIG. 1 is a system block diagram depicting the object filtering system environment of the present invention.

FIG. 1 depicts the object filtering system environment generally at 20. A client computer application 22 provides a request 23 for information stored in a persistence layer 24. An example of a request may be to find all the divisions that have employees who make more than $17,000. The present invention provides to the client application 22 the response 26 as a package of objects formatted as an Extensible Markup Language (XML) document. This allows the object package to be searched at the server-side using XML standard searching mechanisms, such as the XPATH specification by the World Wide Web Consortium (W3C). The present invention translates at the server computer 28 the object model into the XML document in real time and applies the XPATH based search criteria when translating the object model so that only the relevant information is returned to the client application 22.

The client application's request 23 may be formatted as an XPATH specification. The present invention uses a mapping module 30 to translate the incoming request 23 to a syntax that is consistent with the persistence layer 24. Common persistence mechanisms are object-oriented database management systems 50 and relational database management systems 52. Thus if the present invention is using a relational database management system 52, then, the request 23 needs to be translated to a format understandable by the relational database management system 52, such as into a structured query language (SQL) format.

The mapping module 30 translates the request in order to query the persistence layer 24. Query results from the persistence layer 24 are sent to the mapping module 30 so that the query results can be filtered and translated into an XML document. The mapping module 30 examines the client's request 23 to determine whether it contains any XPATH based search criteria that may be used to filter the query results. Due to the filtering, the mapping module 30 returns only the results to the client application 22 that were actually requested. The mapping module 30 then encodes with XML tags the filtered results using an object model definition 32 and predefined encoding rules 34. The encoded filtered results 26 are sent back to the client application 22.

The mapping module 30 uses the object model definition 32 and encoding rules 34 to perform the filtering and translation of the query results. The object model definition 32 describes the structure of the object model by detailing the object classes, attributes, and associations 36 of the object model. The encoding rules 34 specify how the classes, attributes, and associations of the filtered query results are to be translated into an XML format in accordance with the object model definition 32.

After filtering and translation, an API 38 returns the encoded filtered results as XML fragments to the client application 22. These XML fragments can either be used by the client application 22 either natively as XML, using XML parser 46, or can be used to populate the client-side object model.

In addition to the ability to subset the objects returned to the client, the information about each object can also be subset, to further decrease the amount of undesired data being sent across the network. This is accomplished by providing as input to the client interface, a template that defines which attributes are returned for objects of a given class.

Client computer 40 and server computer 28 exchange information over network 44. Network 44 may be any type of network, such as a local area network, an intranet, a wide area network, or a global network (e.g., Internet). The server computer 28 returning to the client computer 40 only the requested information significantly reduces the transmission of great amounts of potentially irrelevant information across the network 44.

With the overall system of the present invention discussed, the following components of the present invention are further described below: object model definition 32; mapping module 30; API 38; and persistence layer 24.

Object Model Definition

Figure 2:
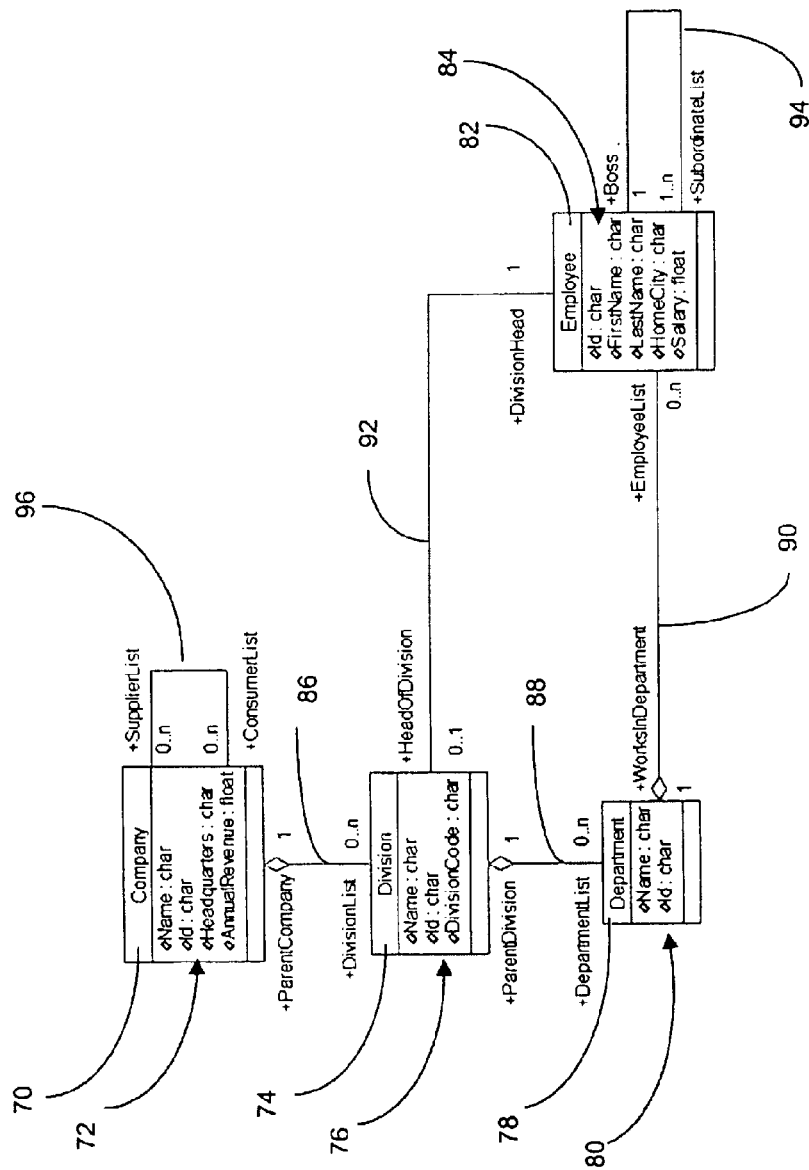
FIG. 2 is a Unified Modeling Language (UML) depiction of an exemplary object model.

The object model definition 32 describes the structure of the object model by detailing the object classes, attributes, and associations 36 of the object model (collectively termed "metadata"). As shown in FIG. 2, a common way of defining an object model is to use an object modeling tool which utilizes the Unified Modeling Language (UML) as the diagramming syntax. For example, an exemplary object model may have four classes:

1) a Company 70 (attributes 72: Id, Name, Annual Revenue, Headquarters location)
2) a Division 74 (attributes 76: Id, Name, DivisionCode)
3) a Department 78 (attributes 80: Id, Name)
4) and an Employee 82 (attributes 84: Id, FirstName, LastName, HomeCity, Salary).

Between these four classes, the following associations are defined: 1) A Company contains Divisions as shown at reference numeral 86; 2) a Division is made up of Departments as shown at reference numeral 88; 3) a Department is made up of Employees as shown at reference numeral 90; 4) a Division has an Employee who is the Division Head as shown at reference numeral 92; 5) An Employee has another Employee who is their boss as shown at reference numeral 94; and 6) a Company can be a Supplier to one or more other Companies as shown at reference numeral 96.

From this object model definition, a variety of implementations can be created. Most object modeling tools provide the facilities to generate Java classes, COM classes, etc. This class generation is done by creating a physical class per UML class (e.g., Company class 70), providing attributes and "get and set" methods for each attribute (e.g., Attribute Name), methods getName and setname. The association traversal (e.g., Company to Division association 86), is done by implementing a method that returns a collection of associated objects. For example, the Company class 70 would have a getDivisionList method that would return a collection (or the appropriate, language specific construct) of Division instances.

In this example, a naming convention has been applied to the names of the associations. Any association role name that ends in "List" indicates that there can be any number of objects that contribute to this association.

Mapping Module

With reference back to FIG. 1, the mapping module 30 maps UML to XML definition to encode the results to be sent to the client application 22. The mapping can be done in a variety of ways. Before explaining the mapping, several XML concepts warrant definition. An XML element is an entry in the XML that has the syntax of:

<tag attributes>value</tag>

An XML element starts with an opening bracket followed by an XML Tag. For example, <Company is the start of an XML element. An XML element can have zero or more. XML attributes. An XML attribute is a named value that exists within the opening element definition. Name is an XML attribute in the following example:

<Company Name="Acme">

Note that attribute values are delimited with quotation marks.

The value of an XML element can contain either text or other imbedded XML elements. All XML elements are ended by a closing </suffixed with the tag name. For example, </Company>is the closure of the Company element:

<Company Name="Acme"></Company>

XML Syntax also allows for a shorthand specification of XML elements that have no value. In this syntax, the closing tag is collapsed into the initial tag definition, as shown in the following example:

<Company Name="Acme"/>.

XML Encoding Rules

To represent the object model specified in UML as XML, the following XML encoding rules 34 are applied:

(1) Each UML class has an XML element tag that matches the name of the class.
(2) Each UML class attribute is mapped to an XML attribute for the corresponding XML element for the class to which the attribute applies.
(3) Each UML association is represented as an imbedded XML element inside the XML element for the classes involved.
(4) Each association generates an XML element definition for both classes involved.

For example, FIG. 3 shows a mapping of the Company and Division classes, their attributes, and the association ParentCompany/DivisionList as generated in accordance with the teachings of the present invention. The Company class has XML element tag 110 with its is attributes Name 112, ID 114, Headquarters 116, and Annual Revenue 118.

The Company class has a company closing tag 120 to indicate when information related to the Company class has completed. The UML association ParentCompany/ DivisionList is represented as an imbedded XML element between company tags 110 and 120.

The reverse traversal of this association (i.e., DivisionList/ParentCompany) is also mapped into XML as shown generally at 122. The Division class has XML element tag 124 with its attributes Name 126, ID 128, and DivisionCode 130. The Division class has a division closing tag 132 to indicate when information related to the Division class has completed. The UML association DivisionList/ ParentCompany is represented as an imbedded XML element between division tags 124 and 132.

Note that the present invention maintains consistency between the object model definition of FIG. 2 and the XML document of FIG. 3 by having the object model definition guide how the tags are created in the XML document. Note also that this mapping technique allows for traversal of the object model in any direction, and allows the client application programmer to decide which is the shortest route to the desired information.

FIGS. 4A–4E show a more specific example of the present invention's XML mapping of the object model (note that the object model contains the four classes and associations described in the UML of FIG. 2). For example, an instance of the Company class begins with XML element tag 110. The instance's attribute values for Name 112, ID 114, Headquarters 116, and Annual Revenue 118 are also provided. The instance has a company closing tag 120 to indicate when information related to the Company class has completed. The UML association ParentCompany/ DivisionList is represented as an imbedded XML element between company tags 110 and 120. For this company instance, the ParentCompany/DivisionList association has a DivisionList starting tag 180 and a DivisionList ending tag 182. Between DivisionList starting tag 180 and its ending tag 182, are a list of six employees within that company's division as shown by XML Employee element tags 190, 192, 194, 196, 198, and 200.

Application Programming Interface

For the present invention, there can be any number of programming interfaces. The preferable ones are to use the Object Modeling tool generated classes in the appropriate programming language, and to access the entire object model contents as one large XML document.

This invention allows another API to be developed, which is to return XML fragments to the client application as shown in FIG. 1 at 38. These XML fragments can either be used natively as XML, using any number of XML parsers, or can be used to populate the client side object model.

Persistence Layer

With reference back to FIG. 1, the persistence layer 24 is responsible for persisting the state of objects. As mentioned above, there can also be a number of persistence mechanisms. The two most common mechanisms are an object-oriented database 50 and a relational database 52.

An object oriented database 50 takes a set of objects and stores them into a container. A container is normally a proprietary data structure implemented on top of the file system. Normally, the modeler defines how objects are grouped together into a container. In this example, we might choose to store a container per company and include in it all of the divisions, departments and employees of that company. We could also choose to make the containers more granular. This design decision should be based on the expected usage patterns of the client applications. Normally, an entire container is loaded into memory at once. Thus, intra-container traversals are very fast but more information may be loaded into memory than is needed. While this invention is not dependent on the container definitions, the performance of the invention may be dependent on it.

A relational database 52 takes a set of objects and maps them into normal, relational database structures, i.e., tables. Encoding rules 34 for a relational database for the mapping of an object model to a relational structure may be the following:

1) For each UML class, a table is defined that matches the name of the class.
2) Each UML class attribute maps to a column in the table for that class.
3) If an association has a maximum cardinality of one for a given role, a column is added to the class participating in that association, which represents a foreign key to the instance of the partner class.
4) If an association has a maximum cardinality of n for a given role, then an association table is added that has a row for each association between two instances of the participating classes.

Figure 5:
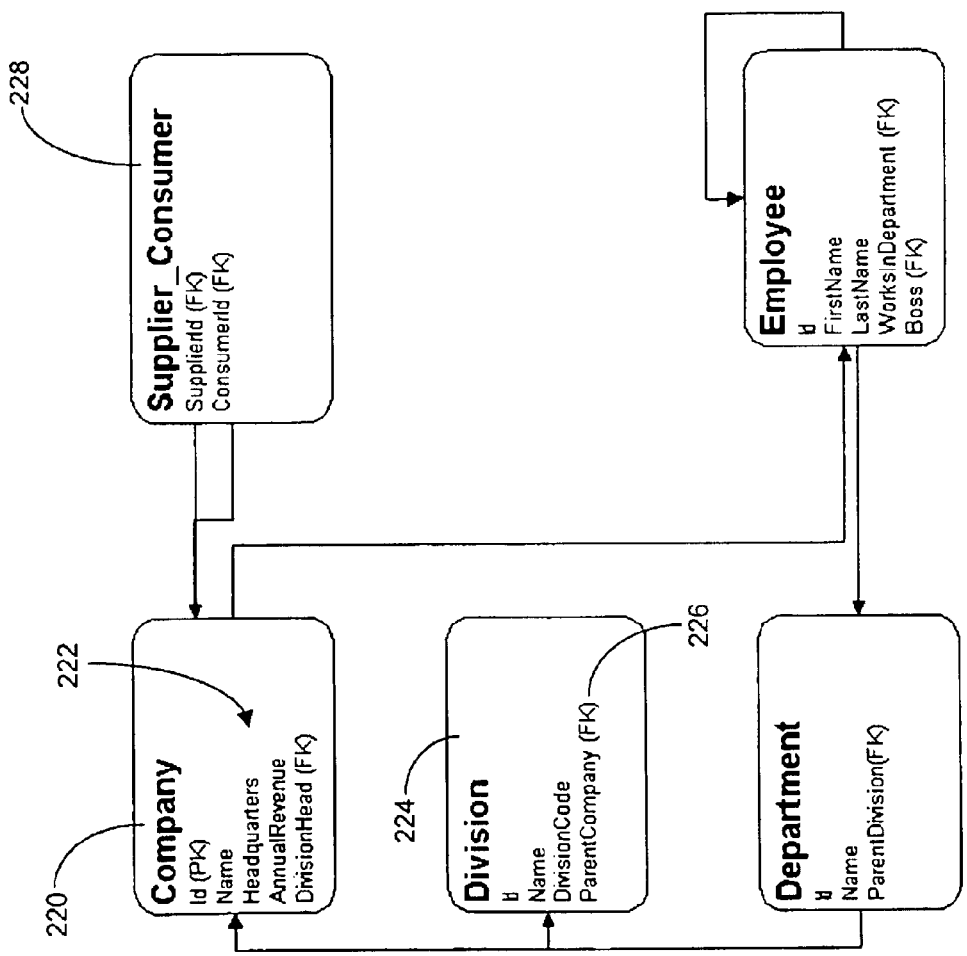
FIG. 5 is an entity relationship diagram showing an exemplary relational model used in the mapping techniques of the present invention.

FIG. 5 is an ER (Entity Relationship) diagram that gives an example for a relational model in view of the mapping rules. For example, in the situation of the UML class Company, a Company table 220 was created. The attributes of the Company class map to columns in the Company table 220 as shown by reference numeral 222. In the situation of the UML class Division, a Division table 224 was created. Because the DivisionList/ParentCompany association has a maximum cardinality of one, a ParentCompany column 226 was added to the Division table 224.

In the situation of the SupplierList/ConsumerList association which has a max cardinality of n, a Supplier_ Consumer association table 228 was created. Supplier_ Consumer association table 228 includes a SupplierD and ConsumerID row in order to express this association in the relational model.

Note that in this database model, when an association is represented as a foreign key relationship, there is no persistence of the bidirectional nature of this association. This information may be persisted in additional "metadata" about this database model. This metadata is used for the implementation of this present invention on a relational database persistence layer.

Attribute Filtering

In addition to the ability to subset the objects returned to the client, the information about each object can also be subset, to further decrease the amount of undesired data being sent across the network. This may be accomplished by providing as input to the client application's programming interface, a template that defines which attributes are returned for objects of a given class.

For example, if the application only needs the division's division code, a template can be included on the request which limits the information returned to just this. The template <Division DivisionCode=""> will limit the returned information about any divisions to just be the DivisionCode.

As another example, if the application only needs the Company's headquarters location, a template can be included that limits the returned information. The template <Company Headquarters=""/>will limit the returned information about any companies to just be the Headquarters information.

Object Filtering Example

If an individual company has 10 Divisions, each with 10 Departments, each with 10 employees. This means that there are 1000 employees in this company. As an example of the present invention, if the client application wants to find all the divisions that have employees who make more than $17,000, the client computer may issue a request to the server with a selection criteria, encoded using the XPATH specification, to limit the result set. The XPATH specification for this example is:

Division/DepartmentList/Department/EmployeeList/Employee[@Salary>17,000].

In this case, the only object returned is the single division object.

For ease of terminology, we can think of the specification as a series of nodes delimited by a slash. Each node can either by an object criteria node (e.g., Division or Employee [@Salary>17,000) or an association role specification (e.g., DepartmentList). The object criteria node is made up of a specification of a class that an object must meet and a set of attribute criteria, enclosed in brackets [ ], that the object must meet. The class specification can be a specific class name or an asterisk (*), which implies that the objects should not be limited based on their class. For example, if the object model had subclasses of Department called Group and Team, the following example XPATH specification would be used to ignore this fact in asking for this result set:

Division/DepartmentList/*/EmployeeList/Employee @Salary>17,000].

An object criteria node can also specify an attribute criteria (e.g., [@Salary>17,000]). If no attribute criteria is passed, then all objects that match the class criteria are included. All references to a property that is an XML attribute, e.g., Salary, are prefixed by the @ sign.

When this request is received by the mapping layer, it traverses the nodes. The nodes must alternate between a class specification (or object criteria specification) and an association role specification.

The traversal can be done in several ways: a left to right traversal; or a right to left traversal. Note that since this traversal is opposite how the query has been specified, there may be additional metadata which contains the partner role for each association role node. For example, for the EmployeeList association role that was passed, there may be information that indicates that the role of the other end of this association is WorksInDepartment.

An intelligent traversal is where the direction is based on the actual ordinality of the end object criteria. For example, if there are only a few divisions, then it might be more expedient to traverse left to right. However, if the employees who match the object criteria Employee[@Salary>17,000] is smaller than the number of divisions, then it might be more expedient to go right to left.

The bi-directional nature of the associations allow for an intelligent traversal to be accomplished. This makes the object filtering of the present invention as flexible and powerful as possible. For the sake of brevity, a right to left traversal mechanism is described in the next section.

Present Invention's Handling of the Example in Mapping to an Object Persistence Layer Object persistence layers provide a mechanism for retrieving a set of objects based on an attribute search criteria, (e.g., Salary>17,000) or by class. The present invention assumes that the current node upon entry is an object criteria node. At the exit of processing this type of node, a working set of objects are passed to the next node for processing.

When an association role specification node is processed, the association traversal method is sent to each object in the input working object set. Each object that is retrieved via traversing the association is added to the working set which will be the output of this node.

Figure 6:
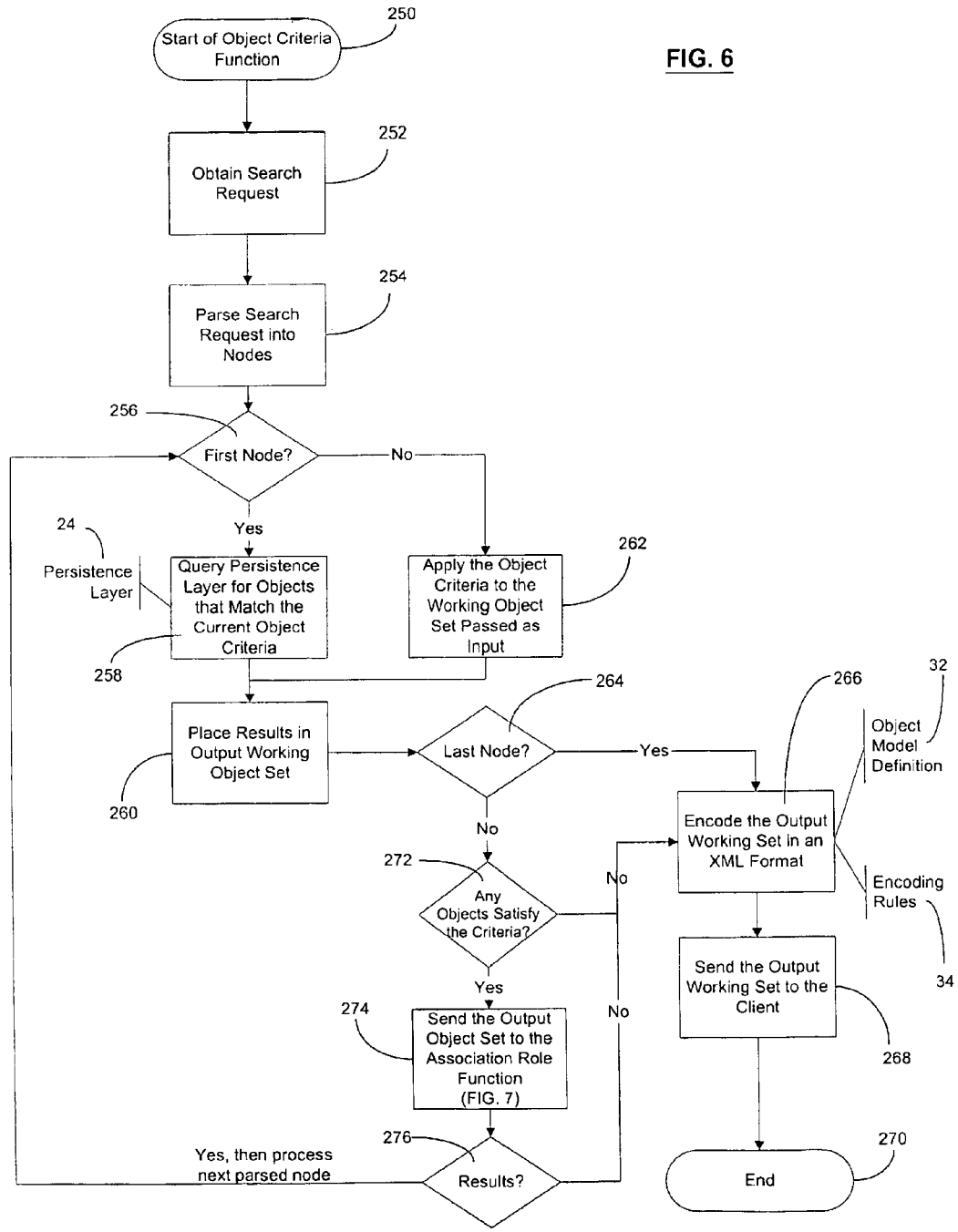
FIG. 6 is a flow chart for the object criteria software function of the present invention.

More specifically, the flow chart for processing object criteria nodes is shown in FIG. 6. The start of the object criteria process flowchart is at block 250. At block 252, the search request from the client application is obtained by the server computer. The search request is parsed at block 254 into nodes. The present invention then iterates through the flow chart for each parsed node.

Decision block 256 examines whether a parsed node is the first node to be processed. If it is, then block 258 queries the persistence layer 24 for objects that match the current object criteria. Block 260 places results from the query in an output working object set.

However, if decision block 256 determines that this is not the first node to be processed, then processing continues at block 262. Block 262 applies to the working object set the object criteria of the criteria node that is currently being processed. The results are placed in the output working object set at block 260. Processing continues at decision block 264.

Decision block 264 examines whether the node that is currently being processed is the last node to be processed. If it is, then processing continues at block 266 which is described below in greater detail.

If decision block 264 determines that the node is not the last one, then the decision block 272 examines whether any objects satisfied the criteria in the object criteria node currently being processed. If no objects satisfied the criteria, then an empty set is returned to the client application, by first encoding the empty output working set in an XML format at block 266. The empty output working set is sent to the client at block 268 before processing terminates at end block 270.

If decision block 272 determines that at least one object satisfied the criteria in the object criteria node currently being processed, block 274 calls the Association Role Function for processing the output object set. Processing continues at the start block 300 on FIG. 7.

Figure 7:
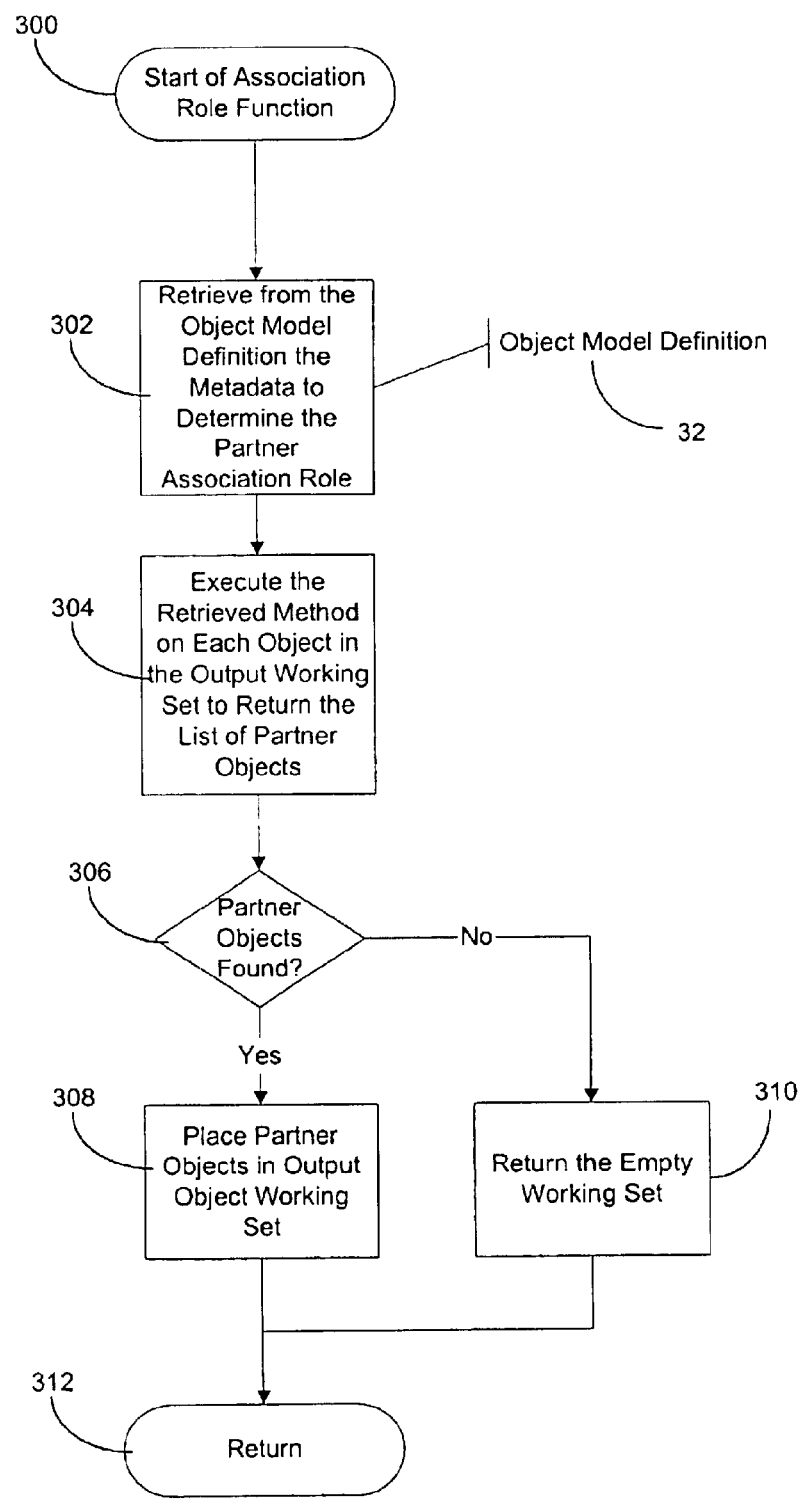
FIG. 7 is a flow chart for the association role software function of the present invention.

FIG. 7 is the flow chart for processing association role nodes. Block 302 retrieves from the object model definition 32 the metadata to determine the partner association role for the role currently being processed. This is then used to determine a method to use on each object. Block 304 executes the method on each object in the output working set to return the list of partner objects. If decision block 306 determines that partner objects were found, then block 308 places the partner objects in the output object working set. If decision block 306 determines that partner objects were not found, then block 310 returns an empty working set. At return block 312, processing returns to decision block 276 of FIG. 6.

With reference back to FIG. 6, decision block 276 examines whether there were any results from the Association Role Function or only an empty set. If decision block 276 determines that no results were returned, then an empty set is returned to the client application, by first encoding the empty output working set in an XML format at block 266. The empty output working set is sent to the client at block 268 before processing terminates at end block 270.

However, if non-empty results were returned, then processing for the next node in the parsed search request continues at decision block 256. Ultimately if there are objects that satisfy the criteria specified in the parsed search request and there are results in response to the Association Role Function, then block 266 encodes the resultant objects. The resultant objects are encoded in an XML format using the object model definition 32 and encoding rules in accordance with the teachings of the present invention. Block 268 sends the encoded filtered results to the client application before processing terminates at end block 270.

As further illustration of the operation of the present invention, the following describes the operation of the above example in view of the flow charts of FIGS. 6 and 7:

1. With reference to FIG. 6, the OCF (Object Criteria Function) is called at block 250, and the input XPATH specification, Division/DepartmentList/*/ EmployeeList/Employee[@Salary>17,000] is provided at block 252.
2. The specification is parsed at block 254. The first node is an object criteria node that specifies a class specification and attribute criteria, Employee[@Salary>17, 000].
3. Because this is the first node being processed as determined by decision block 256, the underlying persistence layer 24 is called by block 258 in order to ask for all objects that meet this criteria. For the data in our example (as shown in FIGS. 4A–4D), this returns seven Employee objects (Emp3, Emp6, BCEmp2, BCEmp3, BCEmp4, BCEmp6, SCEmp2). Note that this query is not specific to any one company, department, division, etc.
4. At block 260, the seven Employee objects are put into an output working object set.
5. Because this is not the last node and there were seven Employee objects that satisfied the criteria, the Association Role Function (ARF) is called at block 274.
6. With reference to FIG. 7, because we are traversing the nodes in a right to left fashion, the metadata that describes the object model is queried at block 302 to determine the partner association role for the role currently being processed. In this case we query for the partner of EmployeeList and we return WorksInDepartment.
7. At block 304, we send each object the get WorksInDepartment method to return the department that each employee is in. The returned department is merged into the output object working set at block 308.
8. After iterating through all of the input objects, we now have an output object working set at block 308 of four Departments (because some employees were in the same departments and we merged our results). If no objects existed in the working set, we would have returned to our caller.
9. With reference back to FIG. 6, we pass the current working set to the OCF routine again. The OCF routine processes the next parsed node. In this case, the only object criteria is an asterisk, and thus the input working set is just passed through as the output working set at block 260.
10. Because this is not the last node and all the objects in the output working set satisfied the criteria, the ARF routine is called at block 274.
11. With reference back to FIG. 7, the metadata is queried at block 302 to determine the partner role for the DepartmentList role. We find that the ParentDivision role is the correct one.
12. At block 304, we send each object the getParentDivision method to return the division that each department is in. The returned division is merged into the output object working set at block 308. After iterating through all of the input objects, we now have an output object working set of three Divisions (because some of the departments were in the same division).
13. With reference back to FIG. 6, we pass the current working set to the OCF routine again. Results were found and thus processing continues for the next parsed node. Because the next node to be processed is not the first node, processing continues at block 262. At block 262, each object in the output working set is interrogated and in this case, all of the objects match the class criteria, since they are all Divisions.
14. Because this is the last node as determined by decision block 264, the output working set is returned and encoded using the encoding rules at block 266.
15. The resultant encoded output working set is sent to the client application at block 268. Processing terminates at end block 270.

Examples in Mapping to a Relational Database Persistence Layer

The mapping to a relational database persistence layer is very similar in concept to that of the Object persistence layer mapping described above. There are two differences: 1) the interface to the relational database is normally structured query language (SQL) instead of using object method calls; and 2) most databases have extremely good query optimizers that can optimize the traversal path of the table structure. To use this most effectively, we should pass structure as large a query as possible. This allows the optimizer to figure out the best path.

For this sample implementation, it will be assumed that the underlying relational database can optimize the query when inline views are used in the resulting SQL. Thus, the present invention formulates for the above example the following SQL:

Select *

From Division, Department

Where Department.ParentDivision=Division.Id and

Department.Idin (

Select Department.Id

From Department, Employee

Where Employee.WorksInDepartment=Department.Id and

Employee.Salary>17,000

)

Note that in constructing this SQL, all of the association traversals were mapped to a foreign key in the underlying relational database.

To further exemplify the present invention, a second example is provided. In this second example, the client application wants to find all companies that we buy goods from that also sell goods to companies that have an annual revenue less than 200,000. While this example only has three companies listed, it is easy to see that in a real world scenario, a company might have hundreds of suppliers and each of those suppliers might have thousands of consumers. The second example's XPATH specification is:

SupplierList/Company/ConsumerList/Company [@AnnualRevenue<"200,000"] The resulting SQL is as follows:

Select *

From Company as Supplier, Company as Consumer, Supplier_Consumer

Where Supplier_Consumer.SupplierId=Supplier.Id and

Supplier_Consumer.ConsumerId=Consumer.Id and Consumer.AnnualRevenue<200000

These examples show that the preferred embodiment of the present invention can be applied to a variety of situations. However, the preferred embodiment described with reference to the drawing figures is presented only to demonstrate such examples of the present invention. Additional and/or alternative embodiments of the present invention should be apparent to one of ordinary skill in the art upon reading this disclosure. For example, the present invention can reside on multiple server computers, such that each server computer can perform a different operation of the present invention. Thus, one server computer may receive the request from the client computer and pass the request onto a second server computer which may translate the request into a query. The translated query is sent to another server computer that contains the persistence mechanism. The ensuing results are filtered and encoded in accordance with the teachings of the present invention and sent to the client computer.

In still another example of the wide range of variations of the present invention, the present invention includes receiving a request from one client computer and sending the filtered and encoded results to one or more other client computers. The request itself may include who the intended recipient(s) of the results should be.

What is claimed is:

1. A computer-implemented method for retrieving a subset of object data from a persistence layer over a network, wherein the persistence layer is structured at least partially upon an object model definition, comprising the steps of:
   (a) receiving over the network a request from a client computer for object persisted data stored in the persistence layer;
   (b) parsing the request to obtain search criteria and object association data, wherein the object association data identifies at least one association between a pair of objects;
   (c) creating filtering criteria based upon the parsed search criteria and parsed object association data, wherein the object model definition determines how the search criteria and the object association data form the filtering criteria;
   (d) filtering object data from the persistence layer by the filtering criteria in order to generate the object data subset; and
   (e) transmitting the object data subset to the client computer over the network;
   wherein the request includes object criteria nodes and object association role nodes;
   wherein the request is parsed into object criteria nodes and object association role nodes;
   wherein the filtering criteria is created based upon the parsed object criteria nodes and the parsed object association role nodes;
   wherein parsed nodes include the parsed object criteria nodes and the parsed association role nodes;
   wherein at least one of the parsed nodes is selected for use as persistence layer criteria to search the persistence layer;
   wherein search results are obtained from the persistence layer because of use of the persistence layer criteria;
   wherein the persistence layer search results are placed in an output object working set.

2. The method of claim 1 wherein the request alternates between an object criteria node and an object association role node.

3. The method of claim 1 further comprising the step of: receiving over the network from the client computer the request formatted in an XPATH specification format.

4. The method of claim 1 wherein at least one of the object association role nodes includes the object association data that identifies an association between a pair of objects, said method further comprising the steps of:
   retrieving metadata from the object model definition to determine partner association roles for at least one of the parsed object association role nodes;
   determining partner objects based upon the partner association roles; and
   replacing objects in the output object working set with the determined partner objects.

5. The method of claim 4 further comprising the steps of:
   applying criteria from one of the object criteria nodes to the partner objects in the output object working set; and
   removing from the output object working set partner objects that did not satisfy the applied criteria.

6. The method of claim 4 further comprising the steps of:
   applying attribute filtering criteria from one of the object criteria nodes to the partner objects in the output object working set, wherein the attribute filtering criteria includes criteria for filtering objects based upon an object attribute value, wherein a template was used as input for the client computer in order to define which attributes are returned by the method for objects of a given class; and
   removing from the output object working set partner objects that did not satisfy the applied criteria.

7. The method of claim 6 further comprising the step of:
   further filtering the output object working set by performing steps (f) and (g) for object criteria nodes and object association role nodes that are still to be processed:
      (f) applying criteria to the output object working set from an unprocessed object criteria node, and
      (g) determining partner objects based upon an unprocessed object association role node for application of criteria from at least one of the object criteria nodes;
   transmitting the filtered output object working set as the object data subset to the client computer over the network.

8. The method of claim 6 further comprising the step of:
   encoding the output object working set with tags to indicate associations, attributes, and classes of the objects that are in the output object working set.

9. The method of claim 6 further comprising the steps of:
   encoding the output object working set with tags to indicate associations, attributes, and classes of objects that are in the output object working set,
   wherein the encoding with tags is performed based upon encoding rules and upon metadata from the object model definition; and
   transmitting the encoded output object working set to the client computer over the network.

10. The method of claim 6 further comprising the steps of:
    encoding the output object working set with tags to indicate associations, attributes, and classes of objects that are in the output object working set,
    wherein the encoding with tags is performed based upon encoding rules means and upon metadata from the object model definition; and
    transmitting the encoded output object working set to the client computer over the network.

11. The method of claim 1 further comprising the step of:
    encoding the object data subset with tags to indicate associations, attributes and classes of objects that are in the object data subset, wherein the encoding with tags is performed based upon encoding rules means and upon metadata from the object model definition.

12. The method of claim 1 wherein the persistence layer is an object-oriented database management system.

13. The method of claim 1 wherein the persistence layer is an XML formatted file.

14. The method of claim 1 wherein the network is a network selected from the group consisting of local area networks, intranets, wide area networks, global networks, Internet, and combinations thereof.

15. The method of claim 1 wherein the object model definition is based upon a Unified Modeling Language (UML) format.

16. The method of claim 15 further comprising the steps of:
encoding the object data subset with tags to indicate object associations, object attributes and object classes,
wherein the encoding with tags is performed based upon encoding rules means and upon metadata from the UML object model definition.

17. The method of claim 1 wherein the object model definition includes object class data, object attribute data, and object association data.

18. The method of claim 1 wherein the object model definition is based upon an entity relationship diagram definition.

19. The method of claim 18 wherein the persistence layer is a relational database management system, said method further comprising the steps of:
creating a structured query language statement to be used as the filtering criteria,
wherein the parsed search criteria and the parsed object association data are formatted in accordance with metadata from the entity relationship diagram definition in order to create the structure query language statement; and
using the created structured query language statement to retrieve query results from the relational database management system.

20. The method of claim 19 further comprising the steps of:
generating the object data subset by encoding the query results with tags to indicate object associations, object attributes and object classes,
wherein the encoding with tags is performed based upon encoding rules means and upon metadata from the entity relationship diagram definition; and
transmitting the encoded object data subset to the client computer over the network.

21. The method of claim 20 wherein the encoding is performed using Extensible Markup Language (XML) tags, said method further comprising the step of:
transmitting the encoded object data subset to the client computer in order for the client computer to parse the encoded object data subset by an XML searching mechanism.

22. The method of claim 1 wherein in step (d) the filtering of the object data is performed when the object data is retrieved from the persistence layer.

23. The method of claim 1 wherein in step (d) the filtering of the object data is performed when the object data is retrieved from the persistence layer using a portion of the parsed search criteria, and after the object data is retrieved from the persistence layer the object data is further filtered by criteria contained in the other portions of the parsed search criteria.

24. The method of claim 1 wherein in step (d) the filtering of the object data is performed after the object data is retrieved from the persistence layer.

25. A computer-implemented apparatus for retrieving a subset of object data over a network, said apparatus comprising:
a server computer connected to the network to receive an object data request from a client computer over the network, wherein the object data request includes search criteria and object association data, wherein the object association data identifies at least one association between a pair of objects;
an object model definition that contains object class metadata;
a persistence layer that is structured at least partially upon the object class metadata to store object data;
a mapping module connected to the object model definition and to the persistence layer, wherein the mapping model creates filtering criteria based upon the search criteria and the object association data, wherein the object model definition determines how the search criteria and the object association data form the filtering criteria;
wherein object data from the persistence layer is filtered by the filtering criteria in order to generate the object data subset,
wherein the server computer transmits the object data subset to the client computer over the network;
wherein the request includes object criteria nodes and object association role nodes, wherein the filtering criteria is created based upon the object criteria nodes and the object association role nodes;
wherein nodes include the object criteria nodes and the association role nodes;
wherein the mapping module selects at least one of the nodes to use as persistence layer criteria to search the persistence layer, wherein the search results are obtained from the persistence layer because of use of the persistence layer criteria;
wherein an output object working set stores the persistence layer search results.

26. The apparatus of claim 25 wherein structure of the request alternates between an object criteria node and an object association role node.

27. The apparatus of claim 25 wherein the request has a format of an XPATH specification format.

28. The apparatus of claim 25 wherein at least one of the object association role nodes includes the object association data that identifies an association between a pair of objects, wherein the metadata from the object model definition determines partner association roles for at least one of the object association role nodes, said apparatus further comprising:
an association role software function that determines partner objects based upon the partner association roles,
wherein objects in the output object working set are replaced with the determined partner objects.

29. The apparatus of claim 28 further comprising:
an object criteria software function connected to the object association software function to apply criteria from one of the object criteria nodes to the partner objects in the output object working set,
wherein at least one of the partner objects is removed from the output object working that did not satisfy the applied criteria.

30. The apparatus of claim 28 further comprising:
means for applying attribute filtering criteria from one of the object criteria nodes to the partner objects in the output object working set, wherein the attribute filtering criteria includes criteria for filtering objects based upon an object attribute value; and
means for removing from the output object working set partner objects that did not satisfy the applied criteria.

31. The apparatus of claim 30 wherein the mapping module encodes the output object working set with tags to indicate associations, attributes, and classes of the objects that are in the output object working set.

32. The apparatus of claim 30 further comprising:
encoding rules connected to the mapping module that determines how to encode the output object working set with tags to indicate associations, attributes, and classes of objects that are in the output object working set,
wherein the server computer transmits the encoded output object working set to the client computer over the network.

33. The apparatus of claim 25 further comprising:
encoding rules connected to the mapping module that determines how to encode the object data subset with tags to indicate associations, attributes, and classes of objects that are in the output object working set,
wherein the server computer transmits the encoded object data subset to the client computer over the network.

34. The apparatus of claim 25 wherein the persistence layer is an object-oriented database management system.

35. The apparatus of claim 25 wherein the persistence layer is an XML formatted file.

36. The apparatus of claim 25 wherein the network is a network selected from the group consisting of local area networks, intranets, wide area networks, global networks, Internet, and combinations thereof.

37. The apparatus of claim 25 wherein the object model definition is based upon a Unified Modeling Language (UML) format.

38. The apparatus of claim 37 further comprising:
encoding rules connected to the mapping module that determines how to subset with tags to indicate associations, attributes, and classes of objects that are in the output object working set,
wherein the mapping module encodes the object data subset in a manner that is consistent with the encoding rules and the metadata from the UML object model definition,
wherein the server computer transmits the encoded the object data subset to the client computer the network.

39. The apparatus of claim 25 wherein the object model definition includes object class data, object attribute data, and object association data.

40. The apparatus of claim 25 wherein the object model definition is based upon an entity relationship diagram definition.

41. A computer-implemented apparatus for retrieving a subset of object data over a network, said apparatus comprising:
means for receiving over a network an object data request from a client computer over the network, wherein the object data request includes search criteria and object association data, wherein the object association data identifies at least one association between a pair of objects;
means for providing an object model definition that contains object class metadata;
means for providing a persistence layer that is structured at least partially upon the object class metadata to store object data;
means for creating filtering criteria based upon the search criteria and the object association data, wherein the object model definition determines how the search criteria and the object association data form the filtering criteria;
means for filtering object data from the persistence layer by the filtering criteria in order to generate the object data subset,
means for transmitting the object data subset to the client computer over the network;
wherein the request includes object criteria nodes and object association role nodes;
means for creating the filtering criteria based upon the object criteria nodes and the object association role nodes;
wherein nodes include the object criteria nodes and the association role nodes;
means for selecting at least one of the nodes to use as persistence layer criteria to search the persistence layer, wherein the search results are obtained from the persistence layer because of use of the persistence layer criteria;
means for storing the persistence layer search results.

42. The apparatus of claim 41 wherein structure of the request alternates between an object criteria node and an object association role node.

43. The apparatus of claim 41 wherein the request has a format of an XPATH specification format.

44. The apparatus of claim 41 wherein at least one of the object association role nodes includes the object association data that identifies an association between a pair of objects, wherein the metadata from the object model definition determines partner association roles for at least one of the object association role nodes, said apparatus further comprising:
an association role software function that determines partner objects based upon the partner association roles,
wherein objects in the output object working set are replaced with the determined partner objects.

45. The apparatus of claim 44 further comprising:
an object criteria software function connected to the object association software function to apply criteria from one of the object criteria nodes to the partner objects in the output object working set,
wherein at least one of the partner objects is removed from the output object working that did not satisfy the applied criteria.

46. The apparatus of claim 44 further comprising:
means for applying attribute filtering criteria from one of the object criteria nodes to the partner objects in the output object working set, wherein the attribute filtering criteria includes criteria for filtering objects based upon an object attribute value; and
means for removing from the output object working set partner objects that did not satisfy the applied criteria.

47. The apparatus of claim 46 wherein the mapping module encodes the output object working set with tags to indicate associations, attributes, and classes of the objects that are in the output object working set.

48. The apparatus of claim 46 further comprising:
encoding rules connected to the mapping module that determines how to encode the output object working set with tags to indicate associations, attributes, and classes of objects that are in the output object working set, wherein the server computer transmits the encoded output object working set to the client computer over the network.

49. The apparatus of claim 41 further comprising:

encoding rules connected to the mapping module that determines how to encode the object data subset with tags to indicate associations, attributes, and classes of objects that are in the output object working set, wherein the server computer transmits the encoded object data subset to the client computer over the network.

50. The apparatus of claim 41 wherein the persistence layer is an object-oriented database management system.

51. The apparatus of claim 41 wherein the persistence layer is an XML formatted file.

52. The apparatus of claim 41 wherein the network is a network selected from the group consisting of local area networks, intranets, wide area networks, global networks, Internet, and combinations thereof.

53. The apparatus of claim 41 wherein the object model definition is based upon a Unified Modeling Language (UML) format.

54. The apparatus of claim 53 further comprising:

encoding rules connected to the mapping module that determines how to encode the object data subset with tags to indicate associations, attributes, and classes of objects that are in the output object working set, wherein the mapping module encodes the object data subset in a manner that is consistent with the encoding rules and the metadata from the UML object model definition, wherein the server computer transmits the encoded the object data subset to the client computer over the network.

55. The apparatus of claim 41 wherein the object model definition includes object class data, object attribute data, and object association data.

56. The apparatus of claim 41 wherein the object model definition is based upon an entity relationship diagram definition.

* * * * *

UNITED STATES PATENT AND TRADEMARK OFFICE
CERTIFICATE OF CORRECTION

PATENT NO. : 6,917,937 B1
DATED : July 12, 2005
INVENTOR(S) : Rubendall

It is certified that error appears in the above-identified patent and that said Letters Patent is hereby corrected as shown below:

Column 15,
Line 41, after the first instance of "to" insert -- encode the object data --.
Line 47, after "computer" insert -- over --.

Signed and Sealed this

Sixth Day of September, 2005

JON W. DUDAS
*Director of the United States Patent and Trademark Office*